US006484163B1

United States Patent
Lawrence et al.

(10) Patent No.: US 6,484,163 B1
(45) Date of Patent: Nov. 19, 2002

(54) TECHNIQUE FOR DATA MINING OF LARGE SCALE RELATIONAL DATABASES USING SQL

(75) Inventors: Andrew Martin Lawrence, Tempe, AZ (US); Mark Steven Ramsey, Colleyville, TX (US); David Alec Selby, Hampshire (GB); Vincent Philip Thomas, Severna Park, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,524

(22) Filed: Mar. 1, 2000

(51) Int. Cl.[7] .............................................. G06R 17/30
(52) U.S. Cl. ................... 707/3; 707/2; 707/7; 717/162
(58) Field of Search ................. 707/3, 4, 5, 6, 707/7, 2, 103 R; 714/20, 26; 709/103; 717/162

(56) References Cited

U.S. PATENT DOCUMENTS 5,684,995 A * 11/1997 Yoshihara ................... 717/162
6,223,717 B1 * 4/2001 Chaudhuri et al. ............ 707/2

OTHER PUBLICATIONS

T. Jorgensen et al. (IEEE publication, 1999) Boosting the performance of weightless neural networks by using a post–processing transformation of the output scores Neural Networks, IEEE Trans., Apr. 1999, pp. 8–1–816.*

T. Jorgensen et al. (IEEE publication, 1999) Theoretical analysis and improved decision criteria for the n–tuple classifier, Pattern Analysis iand Machine Intell., pp. 336–347.*

* cited by examiner

Primary Examiner—Diane D. Mizrahi
(74) Attorney, Agent, or Firm—Gregory M. Doudnikoff

(57) ABSTRACT

A technique for enhanced data mining of large scale relational databases is described. User defined functions (UDF) are created by a user and distributed by a managing node of a database to each node of the database. Upon the issuance of a prespecified SQL command, the UDF is executed by each node relative to the data controlled by each node. Specifically, targeted tuples in the data controlled by each node are scored based on criteria contained in the UDF. A new data field is added to each target tuple, and the score is placed therein. The score is then used to determine whether, for example, a customer which is represented by the tuple should be included in an advertising campaign or to tailor a mailing to a customer based on the score contained in the new data field.

10 Claims, 5 Drawing Sheets

TECHNIQUE FOR DATA MINING OF LARGE SCALE RELATIONAL DATABASES USING SQL

BACKGROUND OF THE INVENTION

1. Field of the Invention

The present invention relates to a technique for executing a data mining algorithm using structured query language (SQL) in a relational database. More particulary, the present invention relates to a technique by which a data mining algorithm may be implemented relative to a relational database without significantly degrading database performance.

2. Description of the Related Art

The sheer size of databases has been growing in recent years. For example, it is relatively common for businesses to have databases of data that are measured in terabyte. These databases may comprise customer information, employee information, stock holder information, etc.

Using customer information as an example, even before the computer revolution, customer information and lists and the like have long been recognized as extremely valuable corporate assets. In theory, it should follow that computers should be able to exploit databases of customer information for enhanced marketing purposes, more concise customer mailings (preventing duplicate mailings), etc. However, this can be extremely complex. A single entry can include a large number of distinct data entries or fields. This number can easily exceed 100. The huge volumes of data overwhelm traditional methods of data analysis (spreadsheets, ad hoc queries in relational DBMSs, multidimensional analysis tools, statistical analysis packages).

Relatively recently, data mining was introduced as a technique that can intelligently and automatically transform data into information. Data mining is the search for relationships and global patterns that exist in large databases, but are hidden among vast amounts of data. Data mining extracts previously unknown, and potentially useful info (eg, rules, constraints, correlations, patterns, signatures and irregularities), focussing on automated methods for extracting patterns and/or models from data.

The data mining community has focussed mainly on automated methods for extracting patterns and/or models from data. The state-of-the-art technique in automated methods of data mining is still in a fairly early stage of development. The primary goals of data mining in practice are prediction and description. Prediction involves using some variables or fields in the database to predict unknown or future values of other variables of interest. Description focuses on finding interpretable patterns that describe the data. The relative importance of prediction and description for particular data mining applications can vary considerably. In business, a successful data mining method is known as "Market Basket Research." Market Basket Research analyzes customer transactions for patterns or "association rules" which help make business decisions (e.g., choose sale items, design coupons, arrange shelves, etc.); this is also known as association rules mining.

For example, data mining can be performed by a company relative to its customer database to determine, based on customer data stored in the database, which customers are most likely to be to good candidates for a new product, and focus marketing efforts on these customers. In data mining, an algorithm is often created which defines the desired mining. In practice, this algorithm can be quite complex. Commonly, the algorithm goes through each customer record and creates a score relative to each customer, which is utilized to determine whether to market the product to the customer.

Typically, the data mining algorithm is embodied in an application which is external to the database. One data mining product which adopts this method is the Intelligent Miner product from International Business Machines (IBM). The external application 'scores' the database from an existing model. These applications utilize an SQL cursor and fetches each record or tuple to be scored sequentially.

However, a number of problems and limitations are associated with current data mining techniques. Databases are getting larger and larger. It is not uncommon to find databases that include terabyte of data. When a data mining operation is attempted relative to a database of such magnitude, a number of things occur. With known techniques, the performance of the target database is seriously degraded. Normal business use becomes is degraded, and the amount of time it takes for a data mining operation to complete is relatively large. One solution to the performance problem has been to write the data from the database out to a flat file, and the data mining operation is then performed relative to the flat file. But this has a number of drawbacks. This technique requires a great amount of processor and memory capacity. Further, with the added levels of complexity involved with creating the flat file, moving the results back to the database, etc., the possibility of operator error and thus contaminated results increases significantly.

Further, the approach whereby an SQL cursor and fetches each tuple to be scored sequentially severely impacts performance in a multiple CPU relational database environment, as each record can only be recovered sequentially.

Accordingly, a need exists for a database mining technique which does not degrade performance and simplifies the application of a data mining algorithm relative to a database.

SUMMARY OF THE INVENTION

An object of the present invention is to provide a technique for enable data mining of large databases without degrading database performance.

Another object of the invention is to provide a simplified technique for implementing data mining of large databases.

Other objects and advantages of the present invention will be set forth in part in the description and the drawings which follow, and, in part, will be obvious from the description or may be learned by practice of the invention.

To achieve the forgoing objects, and in accordance with the purpose of the invention as broadly described herein, the present invention provides a system, method and computer readable code for for performing an enhanced data mining operation of a database distributed over a plurality of nodes, the database comprising a managing node and a plurality of nodes which control access to data in the database, comprising first subprocesses for registering a user defined function with the managing node; second subprocesses for distributing the user defined function from the managing node to each of the plurality of nodes of the database; third subprocesses for initiating the user defined function at each of the plurality of nodes based on a command input to the managing node; fourth subprocesses for adding a data field to each tuple which is to be scored by the user defined function; fifth subprocesses for scoring each tuple targeted by the user defined function; and sixth subprocesses for storing each tuple's score in the newly defined data field. The system may also comprise seventh subprocesses for analyzing each tuple's score and performing an action relative to data contained in each tuple should the tuple's score fit a predetermined score criteria. Each tuple may represent a customer, and if the tuple's score is within a certain range of values, the customer is selected for participation in a marketing plan. Alternatively, each tuple may represent a customer, and the customer is selected for participation in a different marketing plan based on the tuple's score. Further, each tuple may represent a customer, a different advertisement may be associated with defined ranges of scores, and the customer may be sent an advertisement based on the tuple's score.

The present invention will now be described with reference to the following drawings, in which like reference numbers denote the same element throughout.

DESCRIPTION OF THE PREFERRED EMBODIMENT

Figure 1:
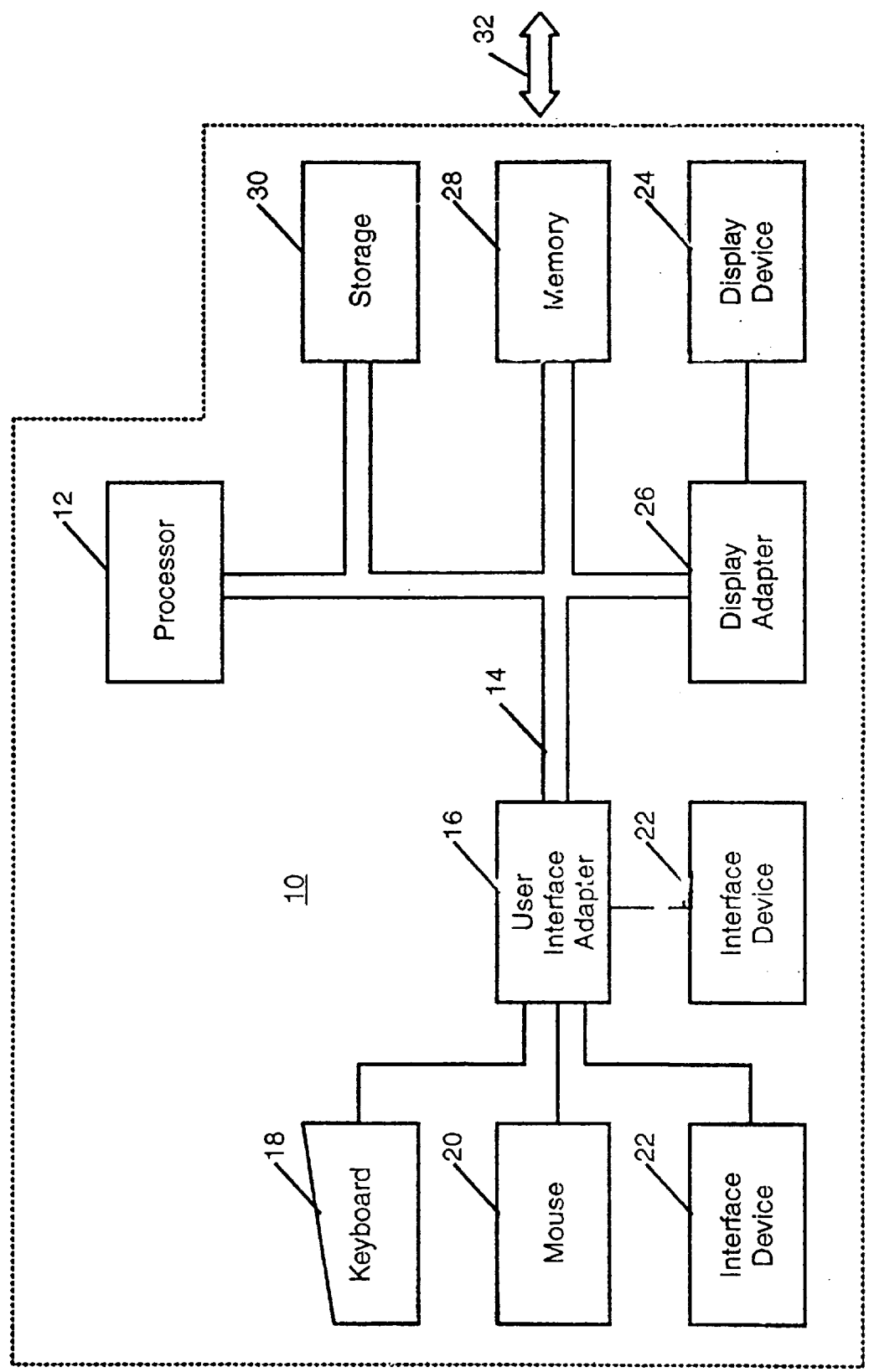
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
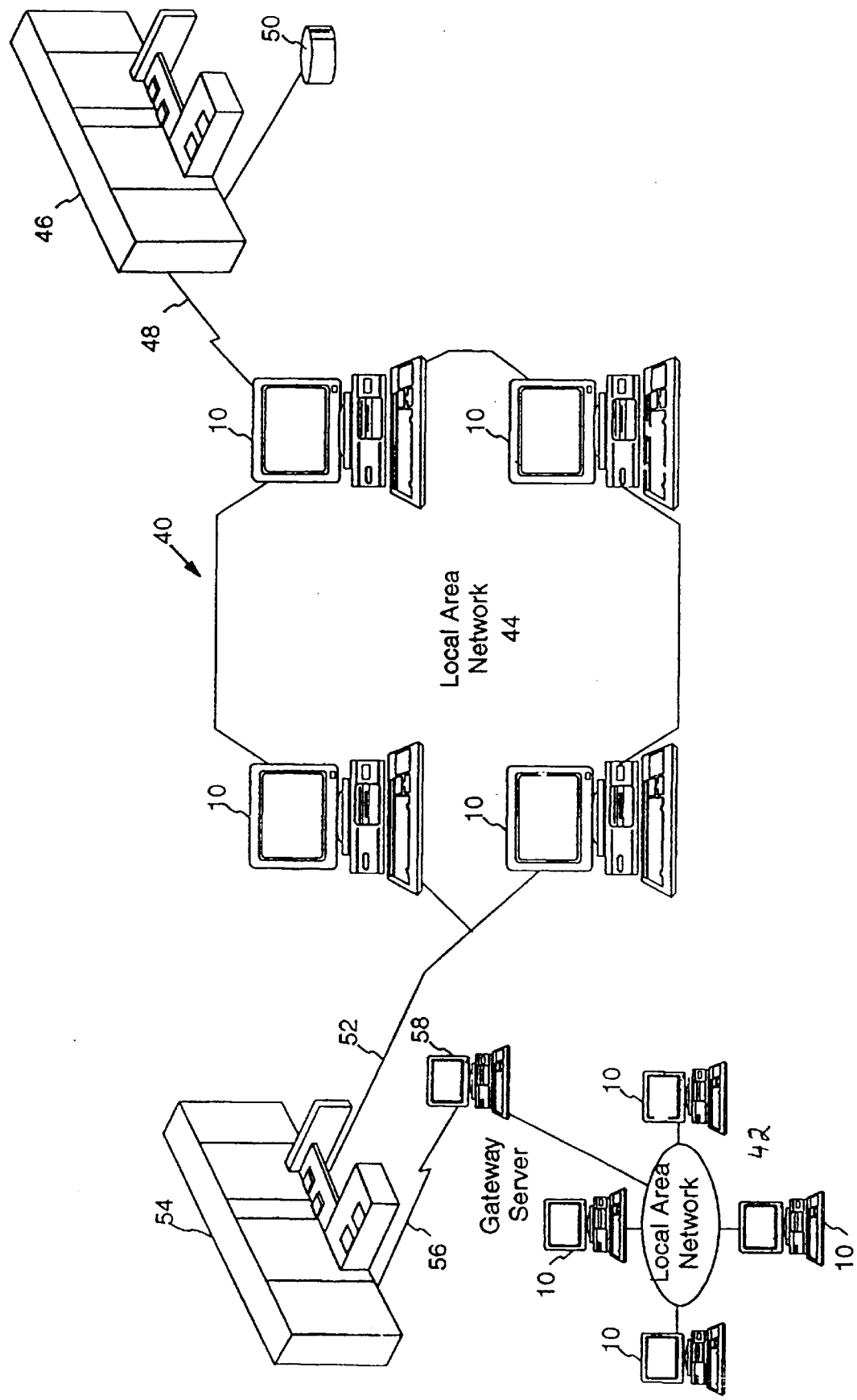
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 5.

Figure 3A:
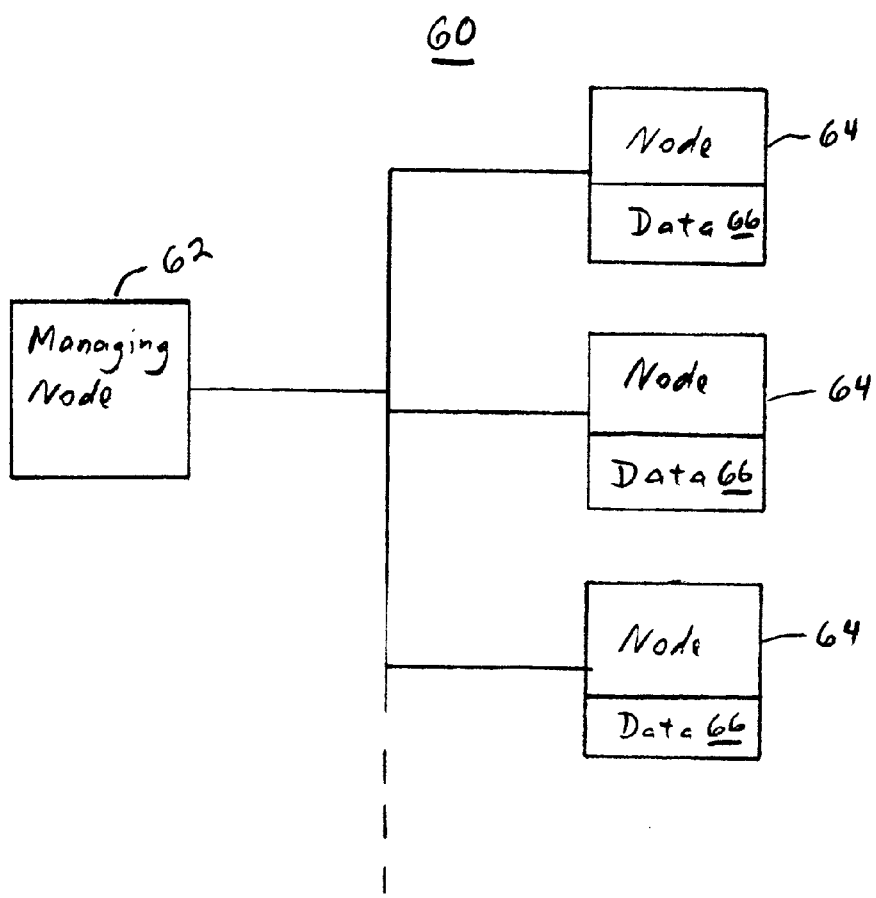
FIG. 3A is a diagram of a large scale multi-node database system in which the present invention may be implemented.
Figure 3B:
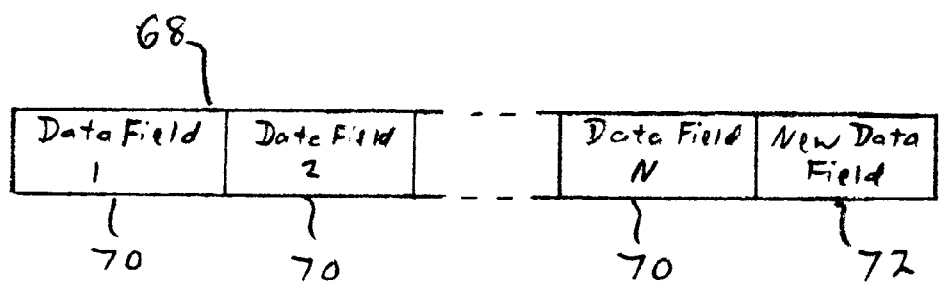
FIG. 3B is a diagram of a target tuple contained in the database.

FIG. 3A illustrates a database environment in which the present invention is effective, and FIG. 3B illustrates a sample tuple in the database illustrated in FIG. 3A.

The present invention utilizes user defined functions (UDFs) in a unique way in relation to data mining to make full use of the query capabilities of the relational database. A UDF for a relational database management system (RDBMS) allows the creation and execution of procedures to be specified as an extension to the standard SQL query language. Since UDFs can be considered extensions to SQL, a SQL command may be used to cause the UDF which is resident in a database to execute relative to the data in the database.

A database 60 includes a managing node 62 and a number of nodes 64. Each node 64 controls a set of data 66 associated therewith which it manages. As illustrated in FIG. 3B, the data 66 includes individual tuples 68. Each tuple 68 includes a number of data fields 70.

Figure 4:
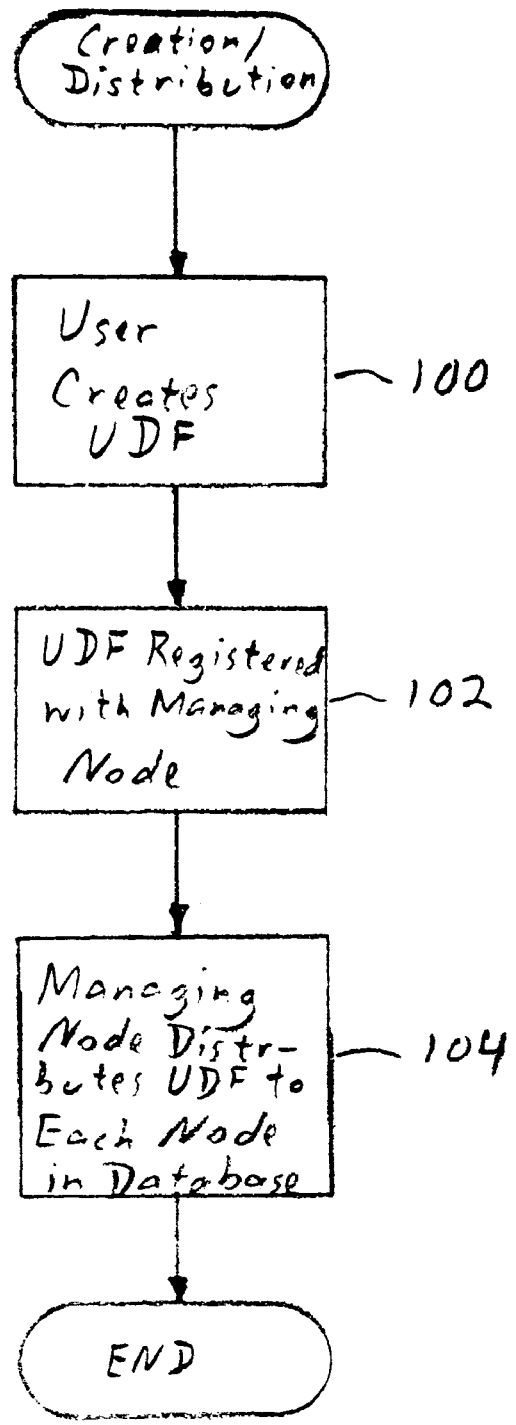
FIG. 4 is a flow chart illustrating the logical steps involved creating and distributing a user defined function in accordance with the present invention.

Referring now to the flowchart of FIG. 4, as per Step 100, a developer/user creates a user defined function (UDF) which will perform the desired mining algorithm relative to the data stored in the database. Typically, the UDF is written in the C programming language. Once written, the UDF is registered with the managing node 62 in accordance with known techniques for registering UDF's (Step 102). The database 60 via the database managing node 62 then distributes the UDF to each of the nodes 64 which comprise the database 60 (Step 104). In a clustered system, each node is a separate system, each node being connected by via a network. In a massively parallel processor, such as the IBM RS/6000 SP, each node is a RISC processor connected by high speed switches. Alternatively, the database may comprise multiple virtual nodes on a single machine which has multiple processors. RDBMS, such as UDB, permit the work to be divided up among each processor.

Figure 5:
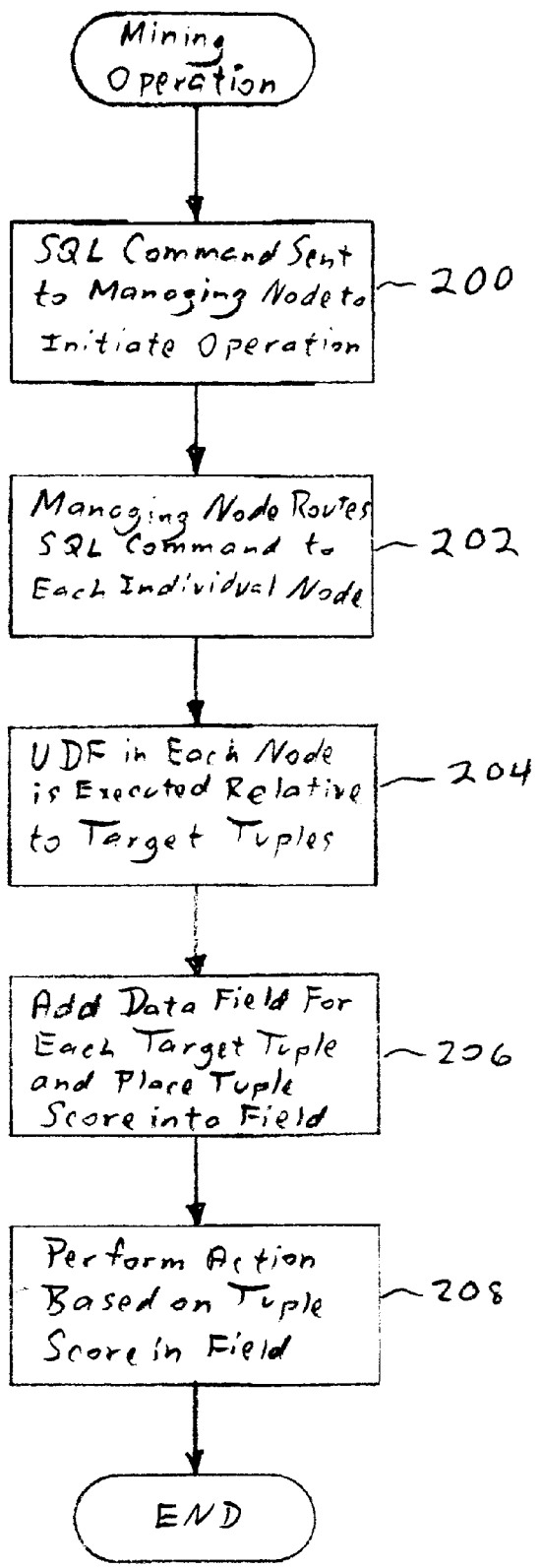
FIG. 5 is a flow chart illustrating the process involved with performing a data mining operation in accordance with the present invention.

The flowchart of FIG. 5 illustrated the logical steps involved with carrying out the data mining operation after the UDF has been distributed to each node. When the UDF for the mining operation is present on each node of the database 60, data mining may be initiated. In the present invention, a data mining operation is initiated by sending a SQL command to the managing node 62 (Step 200). The managing node 62 routes the SQL command to each of the individual nodes 64 of the database 60 (Step 202), and the UDF in which the data mining operation is embodied is then executed by each of the individual nodes 64 relative to the target data in the data 66 controlled by the individual nodes 64 (Step 204), as embodied in individual tuples 68. Preferably, a new data field 72 is added to each target tuple 68 within the database 60 into which data regarding the "score" of the tuple 68 relative to the data mining algorithm is placed (Step 206).

The scores are then subsequently utilized to perform an action relative to the tuple, i.e., relative to the customer which the tuple represents (Step 208). The scores may be used again at a later time for taking another action relative to the tuples. Processing then ends.

For example, if the data mining is of a customer database to determine which customers should receive an advertisement of a particular product, the score is created relative to each customer (tuple) and added to the customer database in a new field for the tuple. After the data mining has been performed, the score contained in the new record relative to each customer may be reviewed in a search for a specific score or a score which falls within a range of scores. A list of customers whose score matches the required score criteria is then created, and the advertisement is then sent to these targeted customers. Similarly, customers with a certain range of scores may be selected for a inclusion in a specific marketing plan. Alternatively, a marketing plan or advertisement may be associated with scores of a defined range, and the customer is sent an advertisement based on the customer's score.

The mining algorithm can be implemented periodically relative to new customers who are added to the database or to customers whose data has been modified. Alternatively, if time sensitive, the UDF and the score record may be deleted altogether from the database.

The score associated with the tuple may be used for any number of different purposes, and is not limited to use in advertising or marketing.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. Computer readable code for performing an enhanced data mining operation of a database distributed over a plurality of nodes, said database comprising a managing node and a plurality of nodes which control access to data in the database, comprising:

first subprocesses for registering a user defined function with the managing node;

second subprocesses for distributing the user defined function from the managing node to each of the plurality of nodes of the database;

third subprocesses for initiating the user defined function at each of the plurality of nodes based on a command input to the managing node;

fourth subprocesses for adding a data field to each tuple which is to be scored by the user defined function;

fifth subprocesses for scoring each tuple targeted by the user defined function; and sixth subprocesses for storing each tuple's score in the newly defined data field.

2. Computer readable code for performing an enhanced data mining operation according to claim 1, further comprising:

seventh subprocesses for analyzing each tuple's score and performing an action relative to data contained in each tuple should the tuple's score fit a predetermined score criteria.

3. Computer readable code for performing an enhanced data mining operation according to claim 2, wherein each tuple represents a customer, and if the tuple's score is within a certain range of values, the customer is selected for participation in a marketing plan.

4. Computer readable code for performing an enhanced data mining operation according to claim 2, wherein each tuple represents a customer, and the customer is selected for participation in a different marketing plan based on the tuple's score.

5. Computer readable code for performing an enhanced data mining operation according to claim 2, wherein each tuple represents a customer, a different advertisement is associated with defined ranges of scores, and the customer is sent an advertisement based on the tuple's score.

6. In a computing environment, a system for performing an enhanced data mining operation of a database distributed over a plurality of nodes, said database comprising a managing node and a plurality of nodes which control access to data in the database, comprising:

means for registering a user defined function with the managing node;

means for distributing the user defined function from the managing node to each of the plurality of nodes of the database;

means for initiating the user defined function at each of the plurality of nodes based on a command input to the managing node;

means for adding a data field to each tuple which is to be scored by the user defined function;

means for scoring each tuple targeted by the user defined function; and means for storing each tuple's score in the newly defined data field.

7. A system for performing an enhanced data mining operation according to claim 6, further comprising:

means for analyzing each tuple's score and performing an action relative to data contained in each tuple should the tuple's score fit a predetermined score criteria.

8. A system for performing an enhanced data mining operation according to claim 7, wherein each tuple represents a customer, and if the tuple's score is within a certain range of values, the customer is selected for participation in a marketing plan.

9. A system for performing an enhanced data mining operation according to claim 7, wherein each tuple represents a customer, and the customer is selected for participation in a different marketing plan based on the tuple's score.

10. A system for performing an enhanced data mining operation according to claim 7, wherein each tuple represents a customer, a different advertisement is associated with defined ranges of scores, and the customer is sent an advertisement based on the tuple's score.

* * * * *